United States Patent
Shetty et al.

(10) Patent No.: US 8,213,979 B1
(45) Date of Patent: Jul. 3, 2012

(54) METHOD AND SYSTEM FOR FORWARD LINK AND/OR REVERSE LINK POWER CONTROL

(75) Inventors: Manoj Shetty, Overland Park, KS (US); Sachin R. Vargantwar, Overland Park, KS (US); Siddarth S. Oroskar, Overland Park, KS (US); Kamal Doshi, Overland Park, KS (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1355 days.

(21) Appl. No.: 11/839,275

(22) Filed: Aug. 15, 2007

(51) Int. Cl.
*H04B 7/00* (2006.01)

(52) U.S. Cl. ...... 455/522; 455/13.4; 455/69; 455/67.13; 455/127.5; 370/318; 370/252; 375/252; 713/320

(58) Field of Classification Search .............. 455/522, 455/13.4, 15, 69, 67.13, 560, 561, 127.1, 455/127.5; 370/318, 252; 375/252; 713/300, 713/320
See application file for complete search history.

(56) References Cited

U.S. PATENT DOCUMENTS

| | | | |
|---|---|---|---|
| 5,745,520 A | 4/1998 | Love et al. | |
| 6,084,904 A * | 7/2000 | Wang et al. | 375/130 |
| 6,144,841 A | 11/2000 | Feeney | |
| 6,233,439 B1 | 5/2001 | Jalali | |
| 6,597,923 B1 | 7/2003 | Vanghi et al. | |
| 6,622,024 B2 | 9/2003 | Koo et al. | |
| 6,748,234 B1 * | 6/2004 | Agrawal et al. | 455/522 |
| 6,760,598 B1 | 7/2004 | Kurjenniemi | |
| 7,133,689 B2 | 11/2006 | Koo et al. | |
| 7,480,517 B2 * | 1/2009 | Gross et al. | 455/522 |
| 7,657,277 B2 * | 2/2010 | Montojo et al. | 455/522 |
| 2002/0111183 A1 | 8/2002 | Lundby | |
| 2002/0165004 A1 * | 11/2002 | Chen et al. | 455/522 |
| 2002/0187802 A1 | 12/2002 | Agin et al. | |
| 2003/0134656 A1 | 7/2003 | Chang et al. | |
| 2005/0123059 A1 | 6/2005 | Harris et al. | |
| 2005/0130694 A1 * | 6/2005 | Medvedev et al. | 455/522 |
| 2005/0204192 A1 | 9/2005 | Dominique et al. | |

OTHER PUBLICATIONS

Vijay K. Garg, IS-95 CDMA and cdma2000: Cellular/PCS Systems Implementation, Prentice Hall PTR, 2000, pp. 181-211.

* cited by examiner

*Primary Examiner* — Shaima Q Aminzay (57) ABSTRACT

Methods and systems for adjusting a transmit power of a forward link or reverse link signal make use of variable adjustment parameters. The wireless signal is received to obtain a received signal. An observed signal-to-noise ratio (SNR) and an observed frame error rate (FER) for the received signal are determined. In an outer loop process, an adjustment increment is selected based on how much the observed FER differs from the target FER, and the target SNR is adjusted by the adjustment increment. In an inner loop process, a power adjustment command is selected based on a comparison between the observed SNR and a target SNR. The power adjustment command instructs the transmitter of the wireless signal to either increase or decrease the transmit power of the wireless signal. The power adjustment increment may also depend on the observed FER.

5 Claims, 6 Drawing Sheets

METHOD AND SYSTEM FOR FORWARD LINK AND/OR REVERSE LINK POWER CONTROL

BACKGROUND

1. Field of the Invention

The present invention relates to telecommunications and, more particularly, to methods and systems for forward link and/or reverse link power control that use variable power control parameters.

2. Description of Related Art

Wireless telecommunications networks often use procedures for controlling the transmit power of forward link signals (i.e., signals transmitted from the network to a mobile station) and/or the transmit power of reverse link signals (i.e., signals transmitted from a mobile station to the network). For example, code division multiple access (CDMA) networks may use an "inner loop" process and an "outer loop" process for controlling the transmit power of forward link and/or reverse link signals.

In a conventional "inner loop" process, a receiving device receives a wireless signal transmitted by a transmitting device. The receiving device periodically assesses the strength of the received signal, such as by determining the signal-to-noise ratio (SNR), and compares the observed value to a setpoint. If the observed value is lower than the setpoint, the receiving device instructs the transmitting device to increase the transmit power of the wireless signal. If the observed value is higher than the setpoint, the receiving device instructs the transmitting device to lower the transmit power of the wireless signal.

In a conventional "outer loop" process, the receiving device periodically determines an error level in the received signal. The receiving device may then adjust the setpoint used for power control based on the observed error level. For example, if the error level is too high, the receiving device may increase the setpoint, which may lead to a corresponding increase in the transmit power level, via the "inner loop" process.

In this way, the "inner loop" and "outer loop" process may be used to adjust the transmit power level to maintained a desired signal quality despite changing conditions.

SUMMARY

In a first principal aspect, an exemplary embodiment provides a method for adjusting a setpoint that is used to control a transmit power of a wireless signal. In accordance with the method, the wireless signal is received to obtain a received signal. An adjustment increment is selected, and the setpoint is adjusted by the adjustment increment. To select an adjustment increment, an upward adjustment increment is selected based on how much the observed error level exceeds the target error level (if the observed error level is greater than the target error level) and a downward adjustment increment is selected based on how much the target error level exceeds the observed error level (if the target error level is greater than the observed error level).

In a second principal aspect, an exemplary embodiment provides a method for adjusting a transmit power of a wireless signal that is transmitted by a transmitting device and received by a receiving device as a received signal. In accordance with the method, a power adjustment command from the receiving device is received. A power adjustment increment is selected based on a comparison between an observed error level in the received signal and a target error level. The transmit power is adjusted by the power adjustment increment.

In a third principal aspect, an exemplary embodiment provides a system for controlling a transmit power of a wireless signal transmitted by a wireless communication device. The system comprises a receiver for receiving the wireless signal to obtain a received signal, data storage, a processor, machine language instructions stored in the data storage, and a transmitter for transmitting a power adjustment command to the wireless communication device. The machine language instructions are executable by the processor to (a) determine an observed signal-to-noise ratio (SNR) of the received signal; (b) determine an observed error level in the received signal; (c) select a power adjustment command based on a comparison between the observed SNR and a target SNR; (d) select an adjustment increment based on how much the observed error level differs from the target error level; and (e) adjust the target SNR by the adjustment increment.

DETAILED DESCRIPTION OF EXEMPLARY EMBODIMENTS

1. Overview

The inventors have recognized that conventional methods for forward link and reverse link power control do not always act as rapidly as desired to counteract fast changes in RF conditions. For example, if a "fast fade" occurs during a call, the signal quality may become so poor so quickly that conventional power control methods are unable to counteract the problem before the call is dropped.

To address such limitations of conventional power control methods, the inventors propose using power control parameters that are variable. For example, different power control parameters may be applied depending on the quality of the received signal. That way, when the signal quality is very low, larger adjustments may be applied to allow compensatory power adjustments to occur more quickly. Similarly, when signal quality is very high, larger adjustments may be applied to allow the transmit power to be reduced more quickly, thereby optimizing power usage when RF conditions are good.

The quality of the received signal quality could be characterized in terms of signal-to-noise ratio (SNR), frame error rate (FER), or in other ways. For example, an "outer loop" control process may compare an observed FER to a target FER to determine how to adjust a setpoint (e.g., a target SNR) that is used in an "inner loop" control process. The amount by which the setpoint is adjusted, i.e., the adjustment increment, may be selected based on how much the observed FER exceeds the target FER or on how much the target FER exceeds the observed FER. For example, different upward adjustment increments may be associated with different ranges of above-target observed FER, and different downward adjustment increments may be associated with different ranges of below-target observed FER. That way, the adjustment to the setpoint of the "inner loop" process can be made larger as the difference between the observed FER and target FER becomes larger.

The power adjustment increments that are used in the "inner loop" control process could also depend on the observed FER. For example, different upward or downward power adjustment increments could be associated with different ranges of observed FER.

By using parameters that are variable (e.g., dependent on observed FER), a forward link or reverse link power control process can beneficially respond more quickly to changing RF conditions, thereby reducing the risk of dropping a call when RF conditions become poor and optimizing power conditions when RF conditions are good.

2. Exemplary Network Architecture

Figure 1:
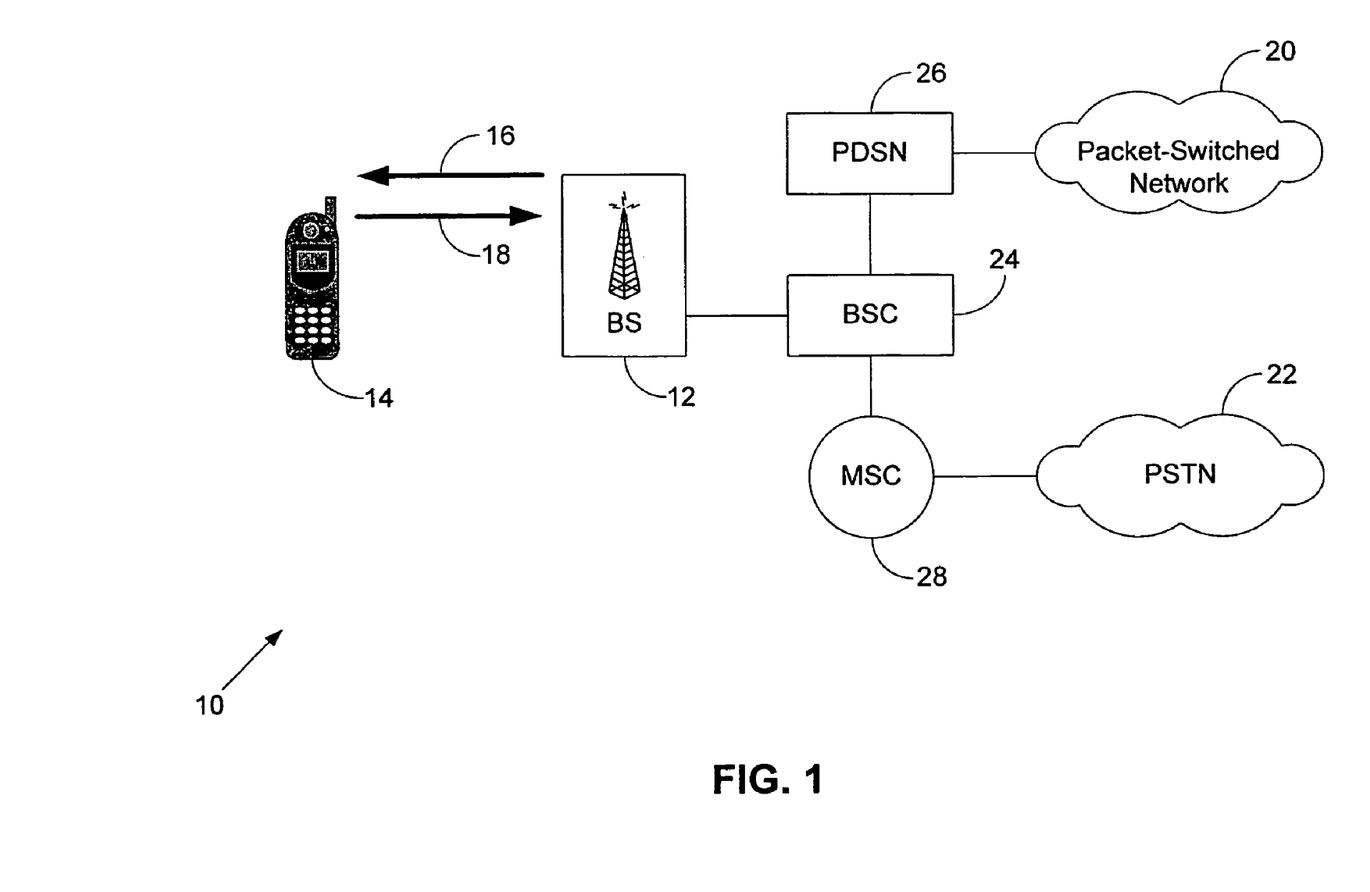
FIG. 1 is a block diagram of a telecommunications network, in accordance with an exemplary embodiment.

FIG. 1 is a simplified block diagram of an exemplary telecommunications network 10, in which exemplary embodiments may be employed. Network 10 includes a base station (BS) 12 that can communicate with a mobile station 14 via an air interface. Mobile station 14 could be a wireless telephone, wireless personal digital assistant (PDA), wirelessly equipped laptop computer, or other wireless communication device.

The air interface communications may include a forward link 16 transmitted from BS 12 to MS 14 and a reverse link 18 transmitted from MS 14 to BS 12. Forward link 16 and reverse link 18 may each include a plurality of channels, including traffic channels and signaling channels. In an exemplary embodiment, the channels are code division multiple access (CDMA) channels, e.g., in accordance with cdma2000 specifications. However, other air interface formats could be used.

BS 12 and MS 14 may communicate via forward link 16 and/or reverse link 18 in order to exchange voice, data, video, or other media. In this regard, MS 14 may use BS 12 to communicate with one or more endpoints, e.g., other mobile stations, e-mail servers, Web servers, gaming servers, media servers, or location-based services, via a packet-switched network 20 (e.g., the Internet) and/or a circuit-switched network, such as the public switched telephone network (PSTN) 22. For example, BS 12 may be communicatively coupled to a base station controller (BSC) 24. BSC 24 may, in turn, be communicatively coupled to packet-switched network 20 via a packet data serving node (PDSN) 26. Alternatively or additionally, BSC 24 may be communicatively coupled to PSTN 22 via a mobile switching center (MSC) 28.

Although FIG. 1 shows only one BS, it is to be understood that network 10 may include multiple BSs, which could be communicatively coupled to BSC 24 or to other network elements that are communicatively coupled to packet-switched network 20 and/or PSTN 22. The multiple BSs could, for example, provide wireless coverage in different locations, so that MS 14 may be served by different BSs when operating in different locations. Moreover, the MS 14 may be able to transfer ongoing communication sessions from one BS to another in a handoff process.

As described in more detail below, one or more channels in forward link 16 and one or more channels of reverse link 18 may be power controlled. In particular, MS 14 may use an "inner loop" and an "outer loop" control process to control the power at which BS 12 transmits a signal in forward link 16. Similarly, BS 12 may use an "inner loop" and an "outer loop" control process to control the power at which MS 14 transmits a signal in reverse link 18.

3. Exemplary Forward Link Power Control Process

Figure 2:
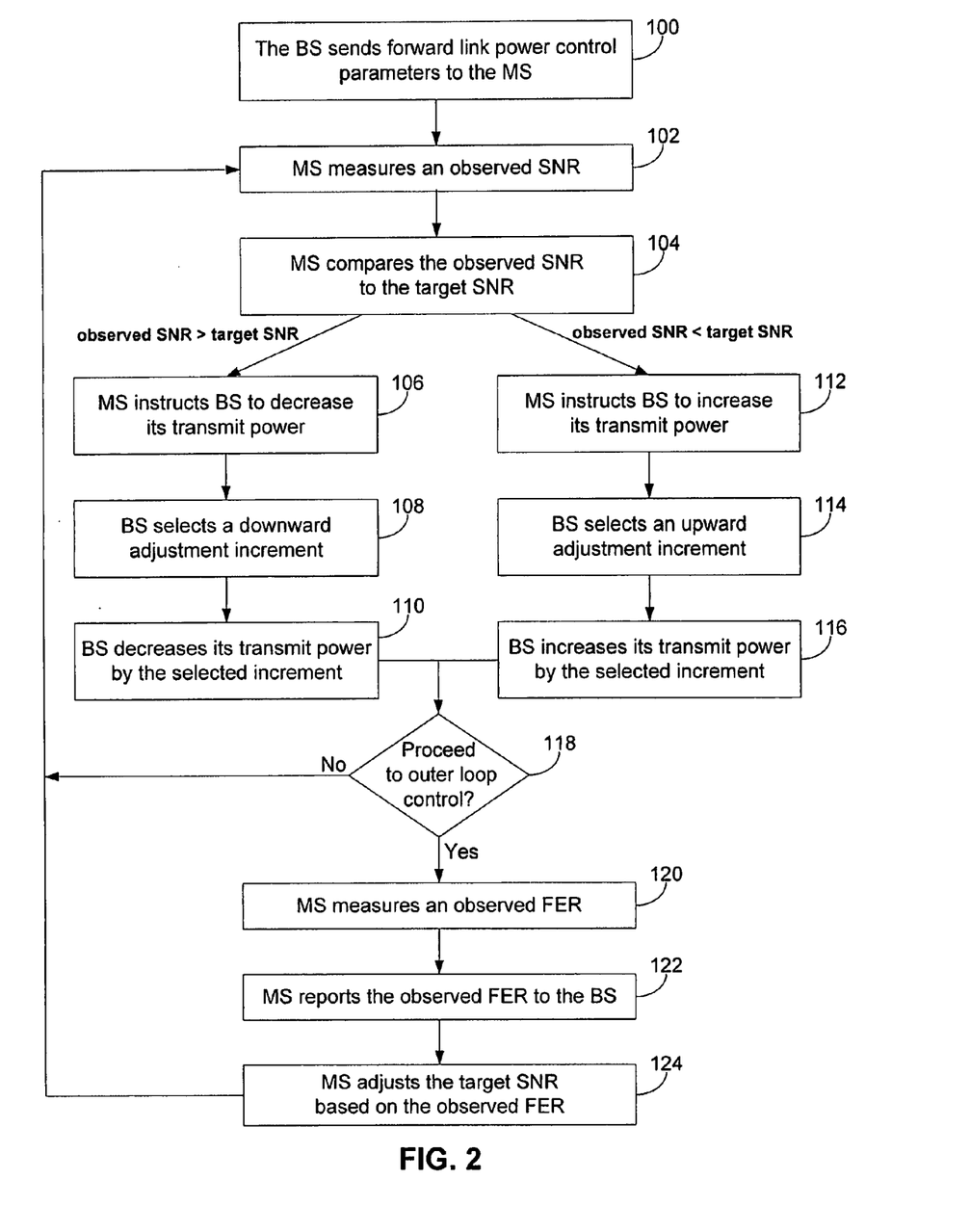
FIG. 2 is a flow chart illustrating a method for forward link power control, in accordance with an exemplary embodiment.

FIG. 2 is a flow chart illustrating an exemplary forward link power control process. The process may begin when the base station (BS) sends forward link power control parameters to the mobile station (MS), as indicated by block 100. The BS may do this, for example, when the MS is handed off to the coverage area of the BS while involved in the call, when the MS requests call origination while in the coverage area of the BS, when the MS answers a call while in the coverage area of the BS, or any other time that the MS will be using one or more power-controlled forward traffic channels of the BS. The BS could also send forward link power control parameters to the MS at other times.

In this example, the forward link power control parameters include a target frame error rate (FER) that is used in an "outer loop" control process, an initial target signal-to-noise ratio (SNR) that is used as a setpoint in an "inner loop" control process, and values of adjustment increments that the MS may use to adjust the target SNR in the "outer loop" process. It is to be understood, however, that other parameters could also be included.

The MS may then measure an observed SNR, as indicated by block 102. The MS may do this by receiving a wireless signal transmitted by the BS, e.g., a forward traffic channel, and determining the SNR of the received signal. In the case of a CDMA air interface, the SNR may correspond to $E_b/N_0$, where $E_b$ is the energy per bit of the signal received by the MS and the $N_0$ is the noise power spectral density.

The MS may then compare the observed SNR to the target SNR, as indicated by block 104. The result of this comparison may determine how the "inner loop" control proceeds. In particular, if the observed SNR is greater than the target SNR, the MS may instruct the BS to decrease its transmit power, as indicated by block 106. In response, the BS may select a downward adjustment increment (block 108) and decrease its transmit power by the selected increment (block 110). On the other hand, if the observed SNR is less than the target SNR, the MS may instruct the BS to increase its transmit power, as indicated by block 112. In response, the BS may select an upward adjustment increment (block 114) and increase its transmit power by the selected increment (block 116).

In this way, the BS may adjust its transmit power in such a way as to bring the SNR of the signal received by the MS closer to the target SNR. That is the goal of the "inner loop" control process. Moreover, different approaches may be used to select the upward and downward adjustment increments. In a simple implementation, the upward and downward adjustment increments are fixed values. Alternatively, the upward and downward adjustment increments may be variable. For example, the BS may select the upward and/or downward adjustment increment from a plurality of values, as described in more detail below.

Once the BS has decreased or increased its transmit power, the MS may determine whether it is time to proceed to the "outer loop" control process, as indicated by block 118. If it is not time to proceed to the "outer loop" process, then the MS begins a new iteration of the "inner loop" process by again measuring an observed SNR (block 102). If it is time to proceed to the "outer loop" process, then the MS measures an observed FER in the signal received from the BS, as indicated by block 120. In an exemplary embodiment, the MS engages in the "inner loop" control process more frequently than the "outer loop" control process. For example, the MS may measure an observed SNR every 1.25 milliseconds but may measure an observed FER only every 20 milliseconds. Thus, the MS may perform several iterations of the "inner loop" control process (blocks 102 through 118) before proceeding to the "outer loop" control process.

After measuring an observed FER (block 120), the MS may report the observed FER to the BS, as indicated by block 122. The MS may do this by transmitting a power measurement report message (PMRM) to the BS. The MS may also use the observed FER to adjust the target SNR, as indicated by block 124. This adjustment is described in more detail below.

Once the target SNR has been adjusted, it may be used as a new target SNR in the next iteration of the "inner loop" control process. Thus, after adjusting the target SNR, the MS may again measure an observed SNR (block 102) and then compare the observed SNR to the new, adjusted target SNR (block 104).

Figure 3:
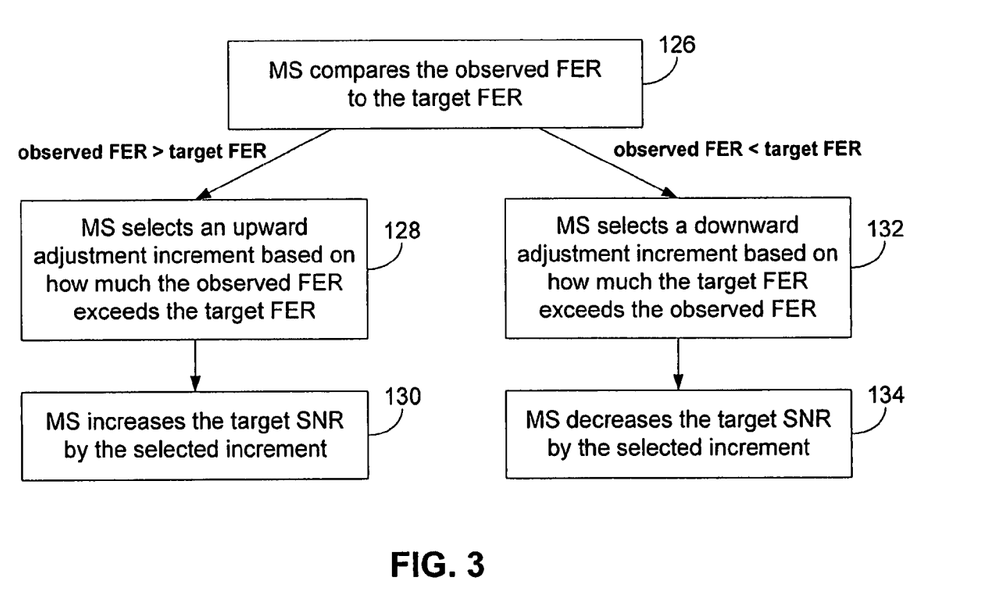
FIG. 3 is a flow chart illustrating a method of adjusting a target signal-to-noise ratio (SNR) based on observed frame error rate (FER), in accordance with an exemplary embodiment.

Adjustment of the target SNR, in order to bring the observed FER closer to the target FER, is the goal of the "outer loop" control process. FIG. 3 illustrates an exemplary method for adjusting the target SNR. In this example, the MS compares the observed FER to the target FER, as indicated by block 126. If the observed FER is greater than the target FER, the MS selects an upward adjustment increment based on how much the observed FER exceeds the target FER, as indicated by block 128. The MS then increases the target SNR by the selected increment, as indicated by block 130. On the other hand, if the observed FER is less than the target FER, the MS selects a downward adjustment increment based on how much the target FER exceeds the observed FER, as indicated by block 132. The MS then decreases the target SNR by the selected increment, as indicated by block 134.

As indicated by blocks 128 and 132, the MS selects an upward (downward) adjustment increment based on how much the observed FER exceeds (is exceeded by) the target FER. In an exemplary embodiment, the MS performs the selection by selecting from among a plurality of adjustment values, with each adjustment value being associated with a range of observed FERs. Table 1 illustrates an example of this approach for the case that the target FER is 3%.

In the example set forth in Table 1, when the observed FER exceeds the target FER, the upward adjustment increment for adjusting the target SNR is selected from among three values (step_up1, step_up2, and step_up3), depending on what range the observed FER falls within. The range that is closest to the target FER is associated with a value, step_up1, which may be considered a default value, whereas the ranges that are successively farther from the target FER are associated with successively greater values. For example, step_up2 may be 100% greater than step_up1, and step_up3 may be 200% greater than step_up1. Similarly, when the target FER exceeds the observed FER, the downward adjustment increment for adjusting the target SNR is selected from three values (step_down1, step_down2, and step_down3), depending on what range the observed FER falls within. The step_down1 parameter, which is associated with the range that is closest to the target FER, may be considered as a default value, and step_down2 and step_down3 may be greater (e.g., 100% greater and 200% greater, respectively).

As set forth in Table 1, the upward and downward adjustment increments used to adjust the transmit power of the BS may also depend on what range the observed FER falls within. Thus, in block 114 of FIG. 2, the BS may select an upward adjustment increment from among three values (PowerUp1, PowerUp2, and PowerUp3), based on the observed FER reported by the MS in block 122. PowerUp1 may be a default value that applies for most ranges of observed FER. However, when the observed FER exceeds the target FER by a sufficient amount, the BS may instead select either PowerUp2 or PowerUp3, as indicated in Table 1. PowerUp2 and PowerUp3 may be greater than PowerUp1 (e.g., 100% greater and 200% greater, respectively). Similarly, in block 108 of FIG. 2, the BS may select a downward adjustment increment from among three values (PowerDown1, PowerDown2, and PowerDown3), based on the observed FER reported by the MS in block 122. PowerDown1 may be a default value that applies for most ranges of observed FER. PowerDown2 and PowerDown3, which apply as indicated in Table 1 when the observed FER is sufficiently low, may be greater than PowerDown1 (e.g., 100% greater and 200% greater, respectively).

It is to be understood that Table 1 is exemplary only. The target FER could be set either higher or lower than 3%, and a greater or fewer number of observed FER ranges could be defined. In addition, the variation in adjustment increments could be different than the progression of default value, 100% greater, and 200% greater that is described above. Moreover, the adjustment increments could vary continuously as a function of observed FER (and/or other factors) rather than discretely, as illustrated in Table 1.

TABLE 1

| Observed FER | 0% to 1% | 1% to 2% | 2% to 3% | 3% to 5% | 5% to 10% | 10% to 20% |
| --- | --- | --- | --- | --- | --- | --- |
| Up adjust. increment (target SNR) | N/A | N/A | N/A | step_up1 | step_up2 | step_up3 |
| Down adjust. increment (target SNR) | step_down3 | step_down2 | step_down1 | N/A | N/A | N/A |
| Up adjust. increment (BS power) | PowerUp1 | PowerUp1 | PowerUp1 | PowerUp1 | PowerUp2 | PowerUp3 |
| Down adjust. increment (BS power) | PowerDown3 | PowerDown2 | PowerDown1 | PowerDown1 | PowerDown1 | PowerDown1 |

In this way, the adjustments to the target SNR that serves as the setpoint for the "inner loop" power control process, as well as the adjustment to the BS transmit power, can vary depending on how far off the observed FER is from the target FER. In particular, the adjustment increments can be made greater the farther the observed FER is from the target FER, thereby allowing the "inner loop" and "outer loop" power control processes to converge to the optimal values more quickly. This in turn, can beneficially optimize power usage when RF conditions are good and can beneficially reduce drops when RF conditions are bad. For example, the BS transmit power may be boosted more quickly to counteract a fast fade condition.

4. Exemplary Reverse Link Power Control Process

Figure 4:
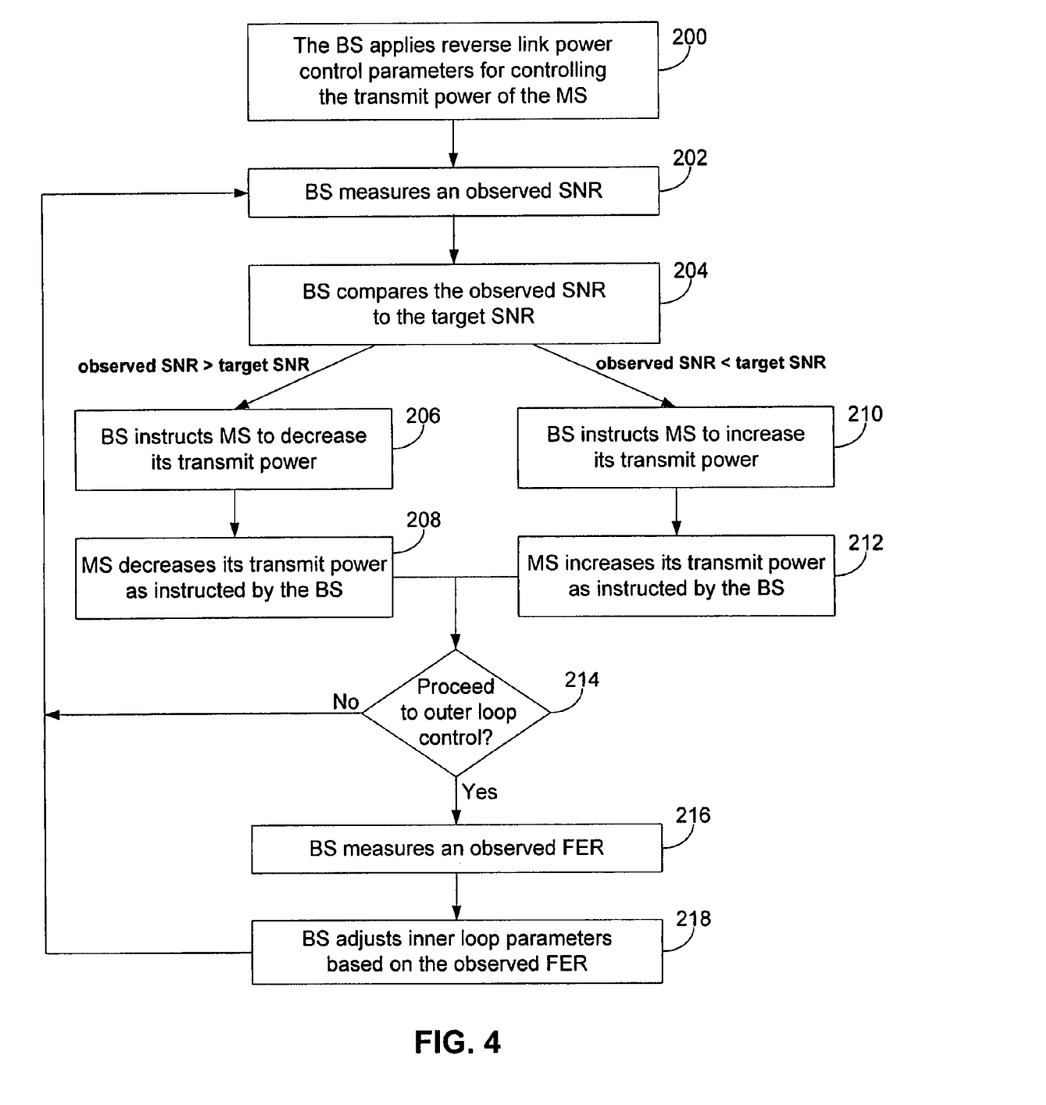
FIG. 4 is a flow chart illustrating a method for reverse link power control, in accordance with an exemplary embodiment.

The power control of the reverse link may be conceptually similar to that of the forward link. FIG. 4 is a flow chart illustrating an exemplary reverse link power control process. The process may begin when the BS applies reverse link power control parameters for controlling the transmit power of the MS, as indicated by block 200. The reverse link power control parameters may include a target FER and an initial target SNR.

The BS receives a signal transmitted by the MS and measures an observed SNR in the received signal, as indicated by block 202. The observed SNR could be measured as $E_b/N_0$, for example, if the signal is a CDMA signal. However, other measures of the SNR of the received signal could be used.

The BS may then compare the observed SNR to the target SNR, as indicated by block 204. If the observed SNR is greater than the target SNR, the BS instructs the MS to decrease its transmit power, as indicated by block 206. In response, the MS decreases its transmit power as instructed by the BS, as indicated by block 208. On the other hand, if the observed SNR is less than the target SNR, the BS instructs the MS to increase its transmit power, as indicated by block 210. In response, the MS increases its transmit power as instructed by the BS, as indicated by block 212.

The BS may instruct the MS to increase or decrease its transmit power by transmitting power control messages to the MS. A power control message might specify an increase or decrease of transmit power without specifying an adjustment increment. In that case, the MS may apply default adjustment increments with which the MS has been provisioned. For example, the MS may store a default value, PowerUp, for upward adjustment and a default value, PowerDown, for downward adjustment.

Alternatively, the power control message from the BS might specify an upward or downward adjustment increment. For example, the power control message could include a 3-bit field, of which the first bit indicates whether the MS should increase or decrease its transmit power (e.g., a "1" may indicate that the MS should increase transmit power and a "0" may indicate that the MS should decrease its transmit power) and the last two bits indicate whether the MS should use default values or modified values for power adjustment. For example, a bit string of "00" may indicate that the MS should use the default values for power adjustment (i.e., increase its transmit power by the PowerUp amount or decrease its transmit power by the PowerDown amount). A hit string of "01" may indicate that the MS should use a power adjustment increment that is 100% higher than the default value (i.e., increase its transmit power by twice the PowerUp amount or decrease its transmit power by twice the PowerDown amount). A bit string of "10" may indicate that the MS should use a power adjustment increment that is 200% higher than the default value (i.e., increase its transmit power by three times the PowerUp amount or decrease its transmit power by three times the PowerDown amount). The BS may determine how to instruct the MS based on the observed FER, as discussed below.

Once the MS has increased or decreased its transmit power, as instructed by the BS, the BS may determine whether it is time to proceed to the "outer loop" control process, as indicated by block 214. If so, the BS may measure an observed FER in the signal received from the MS, as indicated by block 216. If not, the BS begins another iteration of the "inner loop" process by again measuring an observed SNR of the signal received from the MS, as indicated by block 202. As with the forward link power control process described above for FIG. 2, several iterations of the "inner loop" control process may be performed before the BS proceeds to the "outer loop" control process. For example, the BS may measure an observed SNR every 1.25 milliseconds for the "inner loop" control process but may measure an observed FER every 20 milliseconds for the "outer loop" control process.

In the "outer loop" control process, the BS measures an observed FER (block 216) and then adjusts inner loop parameters based on the observed FER (block 218). In particular, the BS may adjust the target SNR and the power adjustment increments. After adjusting the inner loop parameters, the BS proceeds to block 202 to begin the "inner loop" control process with new, adjusted parameters.

Figure 5:
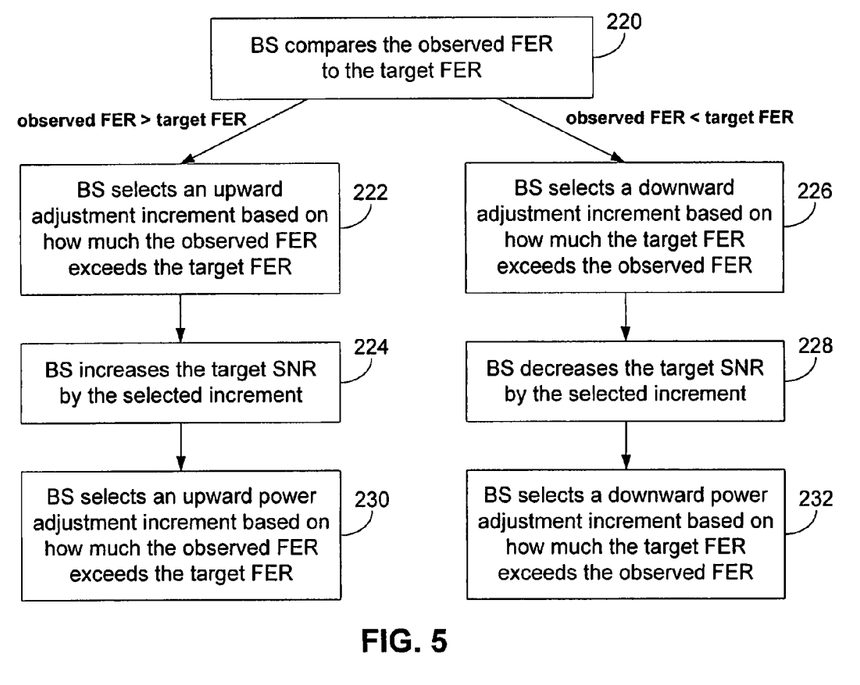
FIG. 5 is a flow chart illustrating a method of adjusting "inner loop" power control parameters based on observed FER, in accordance with an exemplary embodiment.

FIG. 5 illustrates a process that the BS may use to adjust the inner loop parameters. To begin this process, the BS may compare the observed FER to the target FER, as indicated by block 220. If the observed FER is greater than the target FER, the BS selects an upward adjustment increment based on how much the observed FER exceeds the target FER, as indicated by block 222. The BS then increases the target SNR by the selected increment, as indicated by block 224. On the other hand, if the observed FER is less than the target FER, the BS selects a downward adjustment increment based on how much the target FER exceeds the observed FER, as indicated by block 226. The BS then decreases the target SNR by the selected increment, as indicated by block 228.

The BS may select an upward adjustment increment (block 222) or a downward adjustment increment (block 226) based on what range the observed FER falls within, for example, as described above for Table 1. Thus, the BS may select a default value (e.g., step_up1 for upward adjustment or step_down1 for downward adjustment) when the observed FER is in a range that is close to the target FER. However, when the observed FER is sufficiently higher than the target FER, the BS may select an upward adjustment increment that is greater than the default value, such as step_up2 (100% higher than the default value) or step_up3 (200% higher than the default value). Similarly, when the observed FER is sufficiently lower than the target FER, the BS may select a downward adjustment increment that is greater than the default value, such as step_down2 (100% higher than the default value) or step_down3 (200% higher than the default value).

The BS may also select power adjustment increments based on the observed FER. When the observed FER is greater than the target FER, the BS may select an upward power adjustment increment based on how much the observed FER exceeds the target FER (the default value may still apply for the downward power adjustment increment), as indicated by block 230. For example, with reference to Table 1, the BS may select an upward power adjustment increment from among the default value (PowerUp1), twice the default value (PowerUp2), and three times the default value (PowerUp3), depending on which range the observed FER falls within. Thereafter, in the "inner loop" power control process, the BS may instruct the MS to use this selected upward power adjustment increment (block 210 of FIG. 4).

Similarly, when the observed FER is less than the target FER, the BS may select a downward power adjustment increment based on how much the target FER exceeds the observed FER (the default value may still apply for the upward power adjustment increment), as indicated by block 232. For example, with reference to Table 1, the BS may select a downward power adjustment increment from among the default value (PowerDown1), twice the default value (PowerDown2), and three times the default value (PowerDown3), depending on which range the observed FER falls within. Thereafter, in the "inner loop" power control process, the BS may instruct the MS to use this selected downward power adjustment increment (block 206 of FIG. 4).

5. Exemplary Power Control Systems

Figure 6:
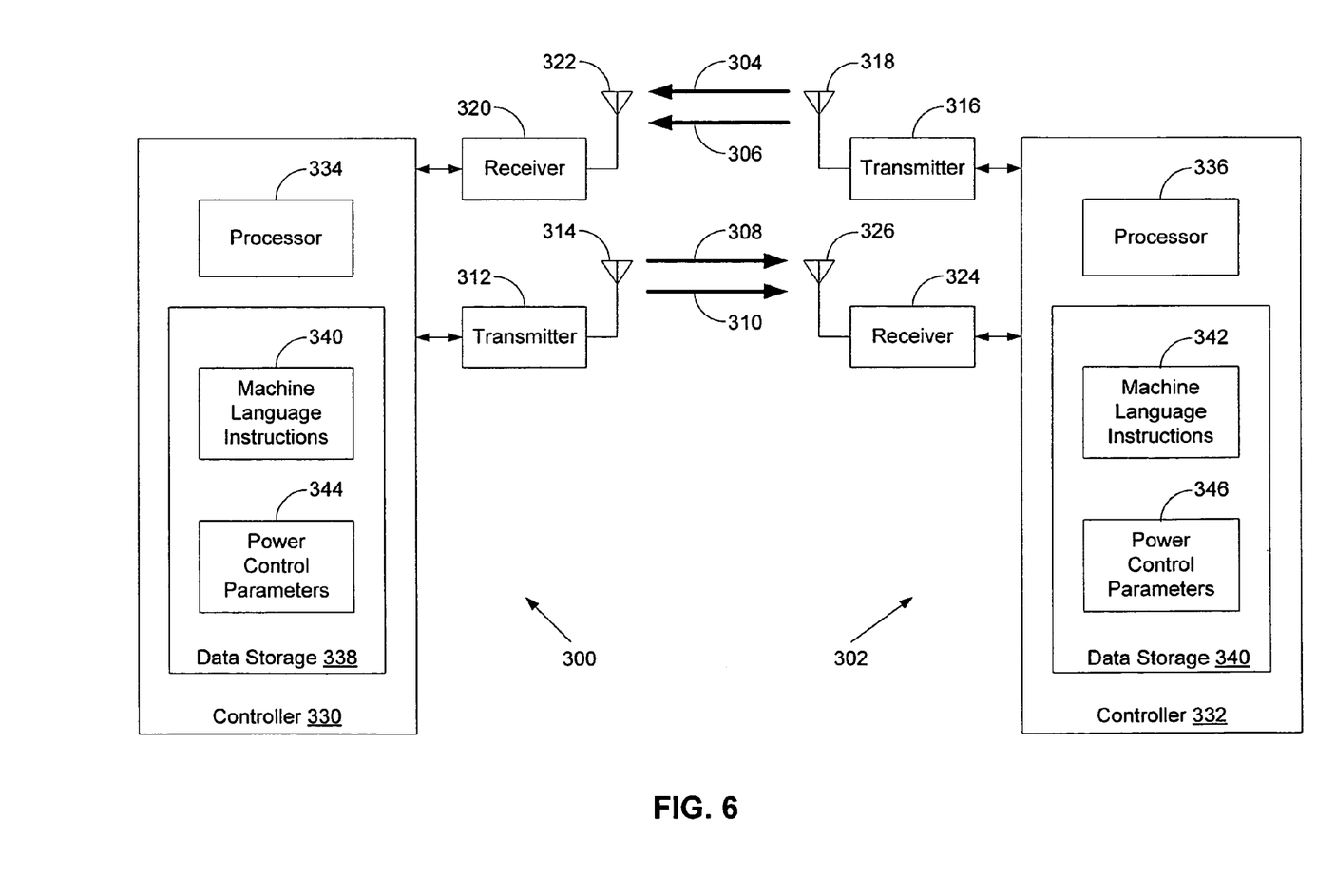
FIG. 6 is a block diagram of two wireless communication devices, each of which controls the power at which the other transmits wireless signals, in accordance with an exemplary embodiment.

FIG. 6 is a simplified block diagram illustrating two wireless communication devices, device 300 and device 302, that communicate with each other via an air interface. In particular, device 302 may transmit a signal in a traffic channel 304 and a signal in a signaling channel 306, which signals may be received by device 300. Similarly, device 300 may transmit a signal in a traffic channel 308 and a signal in a signaling channel 310, which signals may be received by device 302. As described below, the signals in traffic channel 304 and in traffic channel 308 are power controlled. The signals in signaling channels 306 and 310 are used to control the transmitted power of the signals in traffic channels 308 and 304, respectively. It is to be understood that wireless communication devices 300 and 302 could be employed in a telecommunications network as shown in FIG. 1. Thus, device 300 could be a mobile station and device 302 could be a base station, or vice versa.

Device 300 may include a transmitter 312 with a transmit antenna 314 that can transmits signals in traffic channel 308 and in signaling channel 310. Similarly, device 302 may include a transmitter 316 with a transmit antenna 318 that can transmit signals in traffic channel 304 and in signaling channel 306. Device 300 may receive the signals in channels 304 and 306 by means of a receiver 320 and a receive antenna 322. Similarly, device 302 may receive the signals in channels 308 and 310 by means of a receiver 324 and a receive antenna 326.

Although FIG. 6 shows the transmitters and receivers as separate elements, it is to be understood that they could be integrated into a transceiver system. In addition, Although FIG. 6 shows the transmitters and receivers with separate antennas, it is to be understood that the same antenna system could be used for both transmitting and receiving.

Transmitter 312 and receiver 320 in device 300 may be controlled by a controller 330. Similarly, transmitter 316 and receiver 324 may be controlled by a controller 332. Controllers 330 and 332 may be implemented using hardware, software, and/or firmware. In an exemplary embodiment, controllers 330 and 332 each include processors 334 336, respectively, and data storage 338 and 340, respectively. Data storage 338 and 340 may include volatile and/or non-volatile memory. Moreover, data storage 338 and 340 may each store machine language instructions 340 and 342, respectively, and power control parameters 344 and 346, respectively.

Power control parameters 344 in device 300 include parameters for controlling the power at which device 302 transmits signals in traffic channel 304, such as a target FER, an observed FER, a target SNR, an observed SNR, a plurality of setpoint adjustment increments for adjusting the target SNR, and a plurality of power adjustment increments. The setpoint adjustment increments and the power adjustment increments may be associated with ranges of observed FER, e.g., as in Table 1. Power control parameters 346 in device 302 may include similar parameters for controlling the power at which device 300 transmits signals in traffic channel 308.

Machine language instructions 340 are executable by processor 334 to control device 300, and machine language instructions 342 are executable by processor 336 to control device 302. The control functions provided by machine language instructions 340 and 342 may include power control functions, e.g., as described above with reference to FIGS. 2-5. Thus, in the case that device 300 is a mobile station and device 302 is a base station, machine language instructions 340 may be executable by processor by 334 to perform the MS functions described above for FIGS. 2-5, and machine language instructions 342 may be executable by processor 336 to perform the BS functions described above for FIGS. 2-5.

For example, device 300 may operate in the following way to control the power at which device 302 transmits signals in traffic channel 304. Receiver 320 may receive a signal in traffic channel 304, and processor 334 may execute machine language instructions 340 to determine an observed SNR in the received signal and to determine an observed error level, such as a frame error rate (FER), in the received signal. As part of an "inner loop" control process, processor 334 may execute machine language instructions 340 to compare the observed SNR with a target SNR and select a power adjustment command based on the comparison. Transmitter 312 may then transmit the power adjustment command to device 302 using signaling channel 310.

Selecting a power adjustment command may involve selecting a power adjustment increment from among a plurality of stored values based on how much the observed FER differs from the target FER. In this regard, power control parameters 344 stored in data storage 338 may include a plurality of values, with each value associated with an observed FER range, e.g., as in Table 1. Thus, device 300 may select the power adjustment increment by which device 302 is to adjust its transmit power. Alternatively, device 302 may select a power adjustment increment from among a plurality of stored values associated with different observed FER ranges (i.e., values included in the power control parameters 346 stored in data storage 340) in response to the power adjustment command from device 300.

As part of an "outer loop" control process, processor 334 may execute machine language instructions 340 to select an adjustment increment based on how much the observed FER differs from the target FER and to adjust the target SNR by the selected adjustment increment. In particular, power control parameters 344 may include a plurality of values for adjusting the target SNR, with each value associated with an observed FER range, e.g., as in Table 1.

In this way, device 300 may use adjustment parameters that are dependent on the observed FER in controlling the transmit power of device 302. Device 302 may similarly control the transmit power of device 300.

6. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for adjusting a transmit power of a wireless signal that is transmitted by a transmitting device and received by a receiving device as a received signal, said method comprising:
   said transmitting device receiving from said receiving device an observed error level in said received signal;
   after receiving said observed error level, said transmitting device receiving a power adjustment command from said receiving device;
   when said power adjustment command is a power-up command, said transmitting device selecting, based on said observed error level, an upward adjustment increment from among a plurality of power-up values and increasing said transmit power by said upward adjustment increment; and
   when said power adjustment command is a power-down command, said transmitting device selecting, based on said observed error level, a downward adjustment increment from among a plurality of power-down values and decreasing said transmit power by said downward adjustment increment.

2. The method of claim 1, wherein said transmitting device selecting, based on said observed error level, an upward adjustment increment from among a plurality of power-up values comprises:
   when said observed error level is in a first range, said transmitting device selecting a first power-up value as said upward adjustment increment;
   when said observed error level is in a second range, said transmitting device selecting a second power-up value as said upward adjustment increment; and
   when said observed error level is in a third range, said transmitting device selecting a third power-up value as said upward adjustment increment, wherein said second power-up value is greater than said first power-up value and said third power-up value is greater than said second power-up value.

3. The method of claim 1, wherein said transmitting device selecting, based on said observed error level, an upward adjustment increment from among a plurality of power-up values comprises:
   when said observed error level is less than a target error level, said transmitting device selecting a first power-up value as said upward adjustment increment; and
   when said observed error level is greater than said target error level, said transmitting device selecting said upward adjustment increment from among at least a second power-up value and a third power-up value, wherein said second power-up value is greater than said first power-up value and said third power-up value is greater than said second power-up value.

4. The method of claim 1, wherein said transmitting device selecting, based on said observed error level, a downward adjustment increment from among a plurality of power-down values comprises:
   when said observed error level is in a first range, said transmitting device selecting a first power-down value as said downward adjustment increment;
   when said observed error level is in a second range, said transmitting device selecting a second power-down value as said downward adjustment increment; and
   when said observed error level is in a third range, said transmitting device selecting a third power-down value as said downward adjustment increment, wherein said second power-down value is greater than said first power-down value and said third power-down value is greater than said second power-down value.

5. The method of claim 1, wherein said transmitting device selecting, based on said observed error level, a downward adjustment increment from among a plurality of power-down values comprises:
   when said observed error level is greater than a target error level, said transmitting device selecting a first power-down value as said downward adjustment increment; and
   when said observed error level is less than said target error level, said transmitting device selecting said downward adjustment increment from among at least a second power-down value and a third power-down value, wherein said second power-down value is greater than said first power-down value and said third power-down value is greater than said second power-down value.

* * * * *